US006741426B2

(12) United States Patent
Girard

(10) Patent No.: US 6,741,426 B2
(45) Date of Patent: May 25, 2004

(54) ADHESIVE CONTROL FEATURES FOR WIRELESS HEAD SUSPENSION ASSEMBLIES

(75) Inventor: Mark T. Girard, South Haven, MN (US)

(73) Assignee: Applied Kinetics, Inc., Hutchinson, MN (US)

( * ) Notice: Subject to any disclaimer, the term of this patent is extended or adjusted under 35 U.S.C. 154(b) by 0 days.

(21) Appl. No.: 09/793,003

(22) Filed: Feb. 26, 2001

(65) Prior Publication Data

US 2003/0116899 A1 Jun. 26, 2003

Related U.S. Application Data

(60) Provisional application No. 60/184,913, filed on Feb. 25, 2003, and provisional application No. 60/188,965, filed on Mar. 10, 2000.

(51) Int. Cl.[7] .............................................. G11B 21/16
(52) U.S. Cl. .............................. 360/245.4; 360/245.8; 360/245.9
(58) Field of Search .......................... 360/245.4, 245.9, 360/245.8

(56) References Cited

U.S. PATENT DOCUMENTS

| | | | | |
|---|---|---|---|---|
| 5,759,418 A | * | 6/1998 | Frater et al. .................. 216/22 |
| 5,872,687 A | * | 2/1999 | Arya et al. ................ 360/264.2 |
| 6,021,023 A | * | 2/2000 | Hillman .................... 360/244.7 |
| 6,154,343 A | * | 11/2000 | Khan et al. ............... 360/245.9 |
| 6,282,063 B1 | * | 8/2001 | Coon ....................... 360/245.3 |

* cited by examiner

*Primary Examiner*—William K Limowicz
*Assistant Examiner*—Mark Blouin
(74) *Attorney, Agent, or Firm*—Kagan Binder, PLLC

(57) ABSTRACT

The present invention provides a head suspension assembly, which cantilevers a read/write magnetic transducer head adjacent the rotating surface of a disk in a disk drive, and the method of constructing the head suspension assembly using adhesives adhesive control and distribution features designed to improve both the performance characteristics and manufacturing yields of head suspension assemblies. Such adhesive control and distribution features in accord with the present invention may include through-hole features and component perimeter overlays that impede the flow of adhesive onto surfaces and component interfaces of the flex suspension assembly where the presence of such adhesives may degrade the suspension assembly's performance attributes.

24 Claims, 10 Drawing Sheets

ADHESIVE CONTROL FEATURES FOR WIRELESS HEAD SUSPENSION ASSEMBLIES

This application claims the benefit of Provisional application No. 60/184,913 filed Feb. 25, 2000 and claims the benefit of 60/188,965 filed Mar. 10, 2000.

BACKGROUND OF THE PRESENT INVENTION

Most personal computers today utilize direct access storage devices (DASD) or rigid disk drives for data storage and retrieval. Present disk drives include a disk rotated at high speeds and a read/write head that, in industry parlance, "flies" a microscopic distance above the disk surface. The disk includes a magnetic coating that is selectively magnetizable. As the head flies over the disk, it "writes" information, that is, data, to the hard disk drive by selectively magnetizing small areas of the disk; in turn, the head "reads" the data written to the disk by sensing the previously written selective magnetizations. The read/write head is affixed to the drive by a suspension assembly and electrically connected to the drive electronics by an electrical interconnect. This structure (suspension, electrical interconnect, and read/write head) is commonly referred to in the industry as a Head Gimbal Assembly, or HGA.

More specifically, currently manufactured and sold read/write heads include an inductive write head and a magnetoresistive (MR) read head or element or a "giant" magnetoresistive (GMR) read head to read data that is stored on the magnetic media of the disk. The write head writes data to the disk by converting an electric signal into a magnetic field and then applying the magnetic field to the disk to magnetize it. The MR or GMR read head "reads" the data on the disk as it flies above it by sensing the changes in the magnetization of the disk as changes in the voltage or current of a current passing through the MR or GMR head. This fluctuating voltage in turn is converted into data. The read/write head, along with a slider, is disposed at the distal end of an electrical interconnect/suspension assembly.

The suspension is essentially a stainless steel support structure that is secured to an armature in the disk drive. Typically, a suspension will include a base plate including a radius (or spring region), a load beam, and a flexure. The read/write head is attached to the tip of the suspension with adhesive or some other means. At least one tooling discontinuity may be included.

An interconnect may include a base or substrate, which may be a synthetic material such as a polyimide, that supports typically a plurality of electrical traces or leads of the interconnect. The electrical interconnect may also include a polymeric cover layer that encapsulates selected areas of the electrical traces or leads. The interconnect is terminated to bond pads on the read/write head and forms an electrical path between the drive electronics and the read and write elements in the read/write head.

As mentioned previously, the slider "flies" only a microscopic distance—the "fly height"—above the spinning media disk. Control of fly height is critical for the operation of a disk drive. If the fly height is too large, the read/write head will not be able to read or write data, and if it is to small, the slider can hit the media surface, or crash, resulting the permanent loss of stored data. As such, the fly height of the slider is determined in much part by the characteristics of the head suspension assembly to which it is mounted. The head suspension imparts a vertical load, commonly referred to as "gram load", on the slider, normal to the surface of the disk, in order to oppose the "lift" forces created by the air passing between the slider and the spinning disk. As a result, head suspension assemblies are manufactured with a very precise gram load, typically with a tolerance of ±0.2 grams. Another head suspension assembly characteristic that has a significant effect upon the fly height of a slider, is referred to as "static attitude". Static attitude is the angular attitude of the gimbal to which the slider is mounted. Typically, head suspension assemblies are manufactured with tolerances for static attitude approaching ±30 arc-minutes.

Successful reading or writing of data between the head and the spinning media also requires that the head be precisely positioned directly above the location on the disk to which data is to be written or read. As such, great care is taken to design and manufacture head suspension assemblies so as to optimize the suspension's vibrational, or resonant, performance.

There are three basic configurations of electrical interconnect/suspension assemblies that are currently utilized in the disk drive industry. With the first, a Trace Suspension Assembly, or TSA, the electrical interconnect is fabricated integrally with the flexure. The TSA flexure/interconnect is fabricated by selectively removing material from a laminate of stainless steel, polyimide, and copper. The TSA flexure/interconnect is then attached to a loadbeam, typically with one or more spot welds between the stainless steel layer of the TSA flexure/interconnect and the stainless steel of the loadbeam. Another interconnect configuration, termed CIS, is very similar to TSA in that the CIS interconnect is also fabricated integrally with the flexure. However, the CIS interconnect/flexure is fabricated with "additive" processes, rather than "subtractive" processes. The CIS interconnect/flexure is attached to a load beam in much the same manner as the TSA flexures and conventional flexures are, with one or more spot welds between the stainless steel of the flexure and that of the loadbeam. The last interconnect configuration that is utilized today by disk drive assemblers is essentially a flexible circuit. The flexible circuit consists of a base polymer, typically a polyimide, which supports copper traces, or leads. In this case, the interconnect is fabricated independently from the flexure, and is later adhesively attached to a conventional head suspension assembly, to form a Flex Suspension Assembly, or FSA.

The attachment of conventional flexures to load beams with spot welds has been practiced for years throughout the head suspension industry and is well understood. Thus, the attachment of a CIS or TSA interconnect/flexure to a loadbeam utilizes existing techniques, and does not present any significant challenges for manufacturers of head suspension assemblies. On the other hand, adhesive attachment of flexible circuits to conventional head suspension assemblies results in a number of issues which the manufacturer of head suspension assemblies must address. An adequate amount of adhesive is required between the conventional head suspension assembly and the flexible circuit to ensure that the flexible circuit securely attached. However, adhesive that flows into the "active" regions of the flexure or radius can compromise the head suspension assembly's overall performance, specifically it's gram load and static attitude attributes. Additionally, the amount of adhesive joining the flexible circuit to the head suspension assembly must be consistent from one FSA to another so as not to impart a significant amount of variation on the resonant performance of the FSA.

While FSA is significantly cheaper than it's counterparts, namely TSA and CIS, the degradation in FSA performance due to the adhesive attachment of the flexible circuit creates a tradeoff between cost and performance that must be considered when comparing the competing technologies.

As such, it would be desirable to eliminate the degradation in FSA performance associated with the adhesive attachment of the flexible circuit to the head suspension assembly.

SUMMARY OF THE PRESENT INVENTION

It is an object of the present invention to provide a method of adhesively attaching an electrical interconnect to a conventional head suspension assembly without significantly degrading the static attitude attributes of the head suspension assembly.

It is still another object of the present invention to provide a method of adhesively attaching an electrical interconnect to a conventional head suspension assembly without significantly imparting variation to the gram load attributes of the head suspension assembly.

It is yet another object of the present invention to provide a method of adhesively attaching an electrical interconnect to a conventional head suspension assembly without significantly affecting the dynamic resonance attributes of the head suspension assembly.

It is another object of the present invention to provide a method of adhesively attaching an electrical interconnect to a conventional head suspension assembly without significantly affecting the desired gimbal stiffness attributes of the head suspension assembly.

The foregoing objects are provided by the present invention, which is directed to a head suspension assembly that cantilevers a read/write magnetic transducer head adjacent the rotating surface of a disk in a disk drive from an actuator arm of the disk drive, and the method of constructing the head suspension assembly. The head suspension is disclosed in variant embodiments, all including adhesive control and distribution features designed to improve both the performance characteristics and manufacturing yields of head suspension assemblies with adhesively attached electrical interconnects.

Head suspension assemblies and electrical interconnects in accord with the present invention may include through-hole features and component perimeter overlays that impede the flow of adhesive into areas of the flex suspension assembly which may degrade the suspension assembly's performance attributes.

The foregoing objects of the invention will become apparent to those skilled in the art when the following detailed description of the invention is read in conjunction with the accompanying drawings and claims. Throughout the drawings, like numerals refer to similar or identical parts.

DETAILED DESCRIPTION OF THE INVENTION

Figure 1:
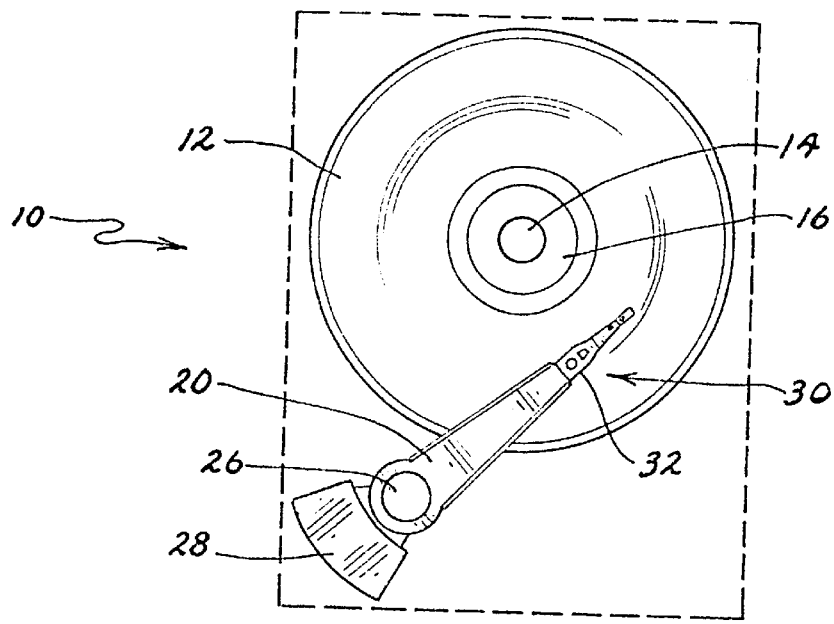
FIG. 1 is a top plan view of a hard disk drive.
Figure 2A:
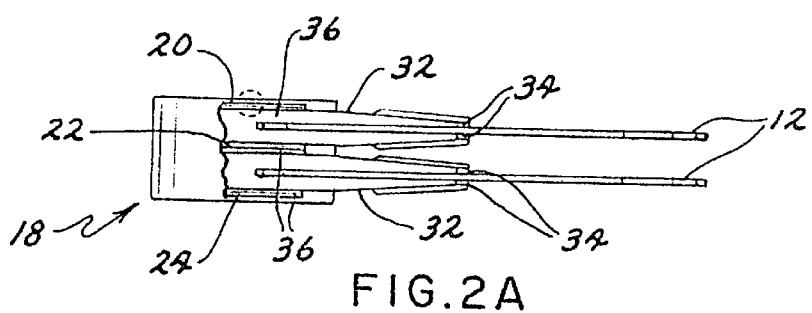
FIG. 2A is a side elevation, partial view of a hard disk drive, such as that shown in FIG. 1.
Figure 2B:
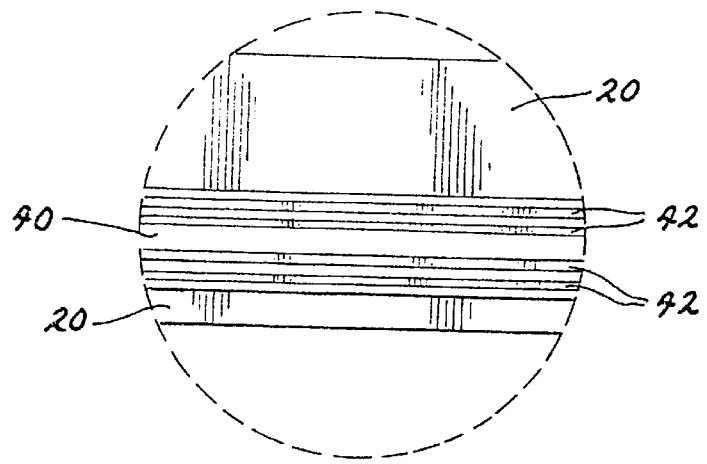
FIG. 2B is an enlarged view of the area shown in the phantom circle in FIG. 2A.

FIGS. 1, 2A and 2B illustrate a hard disk drive 10 in a top plan, highly schematic view. It will be understood that many of the components found in such a disk drive 10, such as memory cache and the various controllers are not shown in the figure for purposes of clarity. As illustrated, drive 10 includes at least one, and typically several, disks 12 mounted for rotation on a spindle 14, the spindle motor and bearing not being shown for purposes of clarity. A disk clamp 16 is used to position and retain the disk 12 on the spindle 14. The disk drive 10 further includes an "E" block 18, best seen in FIG. 2A. The E block 18 gets its name from its shape as viewed from the side. It will be observed that E block 18 includes a plurality of actuator arms 20, 22, and 24, which are supported for pivotal motion by an actuator pivot bearing 26. A voice coil motor assembly 28 is used to control the pivoting motion of the actuator arms 20–24.

Each actuator arm 20–24 includes a head gimbal assembly 30 comprising a suspension 32, a read/write head/slider 34, and interconnect 36 that extends from the head/slider to the actuator flex. The dashed circle shows an expanded view of the arm 20, which includes a substrate 40 (wherein the bracket indicates the lateral extent of the substrate relative to the actuator arm 20 in this particular embodiment) upon which electrical leads or traces 42 are supported. The electrical conductors 42 are typically copper or copper alloy with a gold plating.

The substrate 40 will substantially underlie the traces 42. Substrate 40 may comprise a synthetic material such as polyimide, which may be of the type sold under the brand name Kapton by I.E. DuPont.

Figure 3:
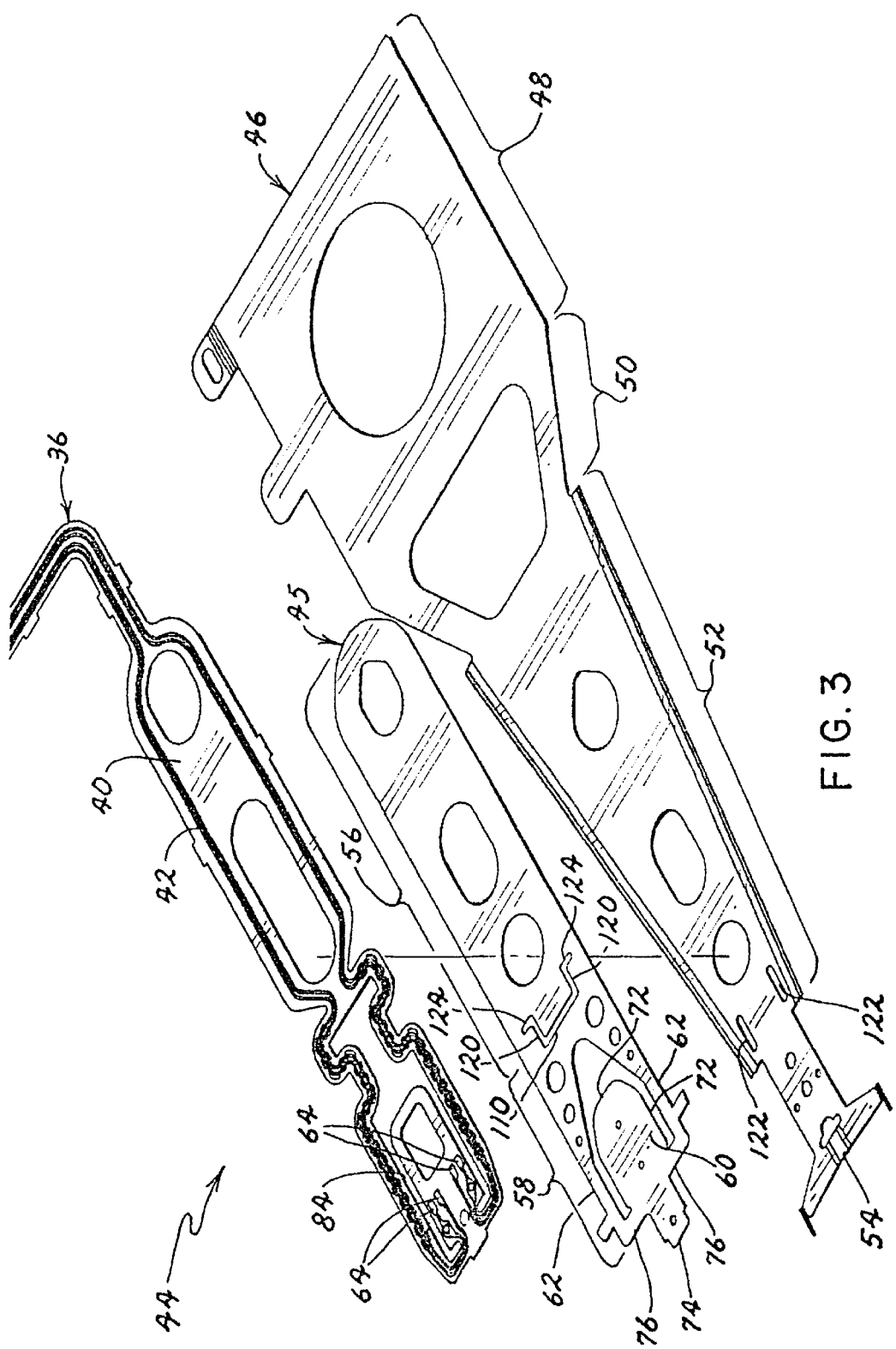
FIG. 3 is an enlarged, exploded perspective view of a suspension/electrical interconnect.
Figure 4:
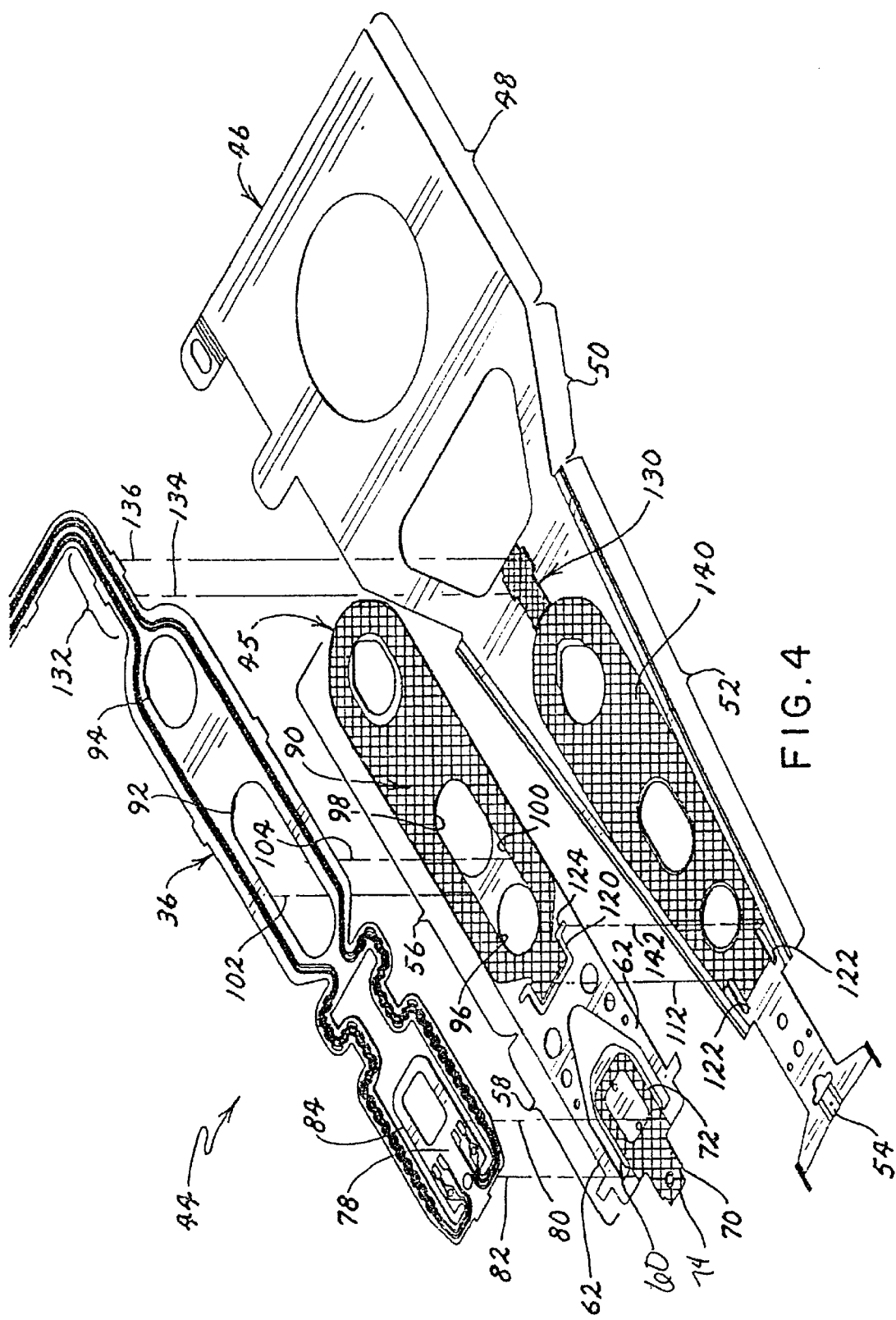
FIG. 4 is an enlarged, exploded perspective view of the suspension/electrical interconnect of FIG. 3, illustrating the adhesive pattern between each surface of the assembly.
Figure 5:
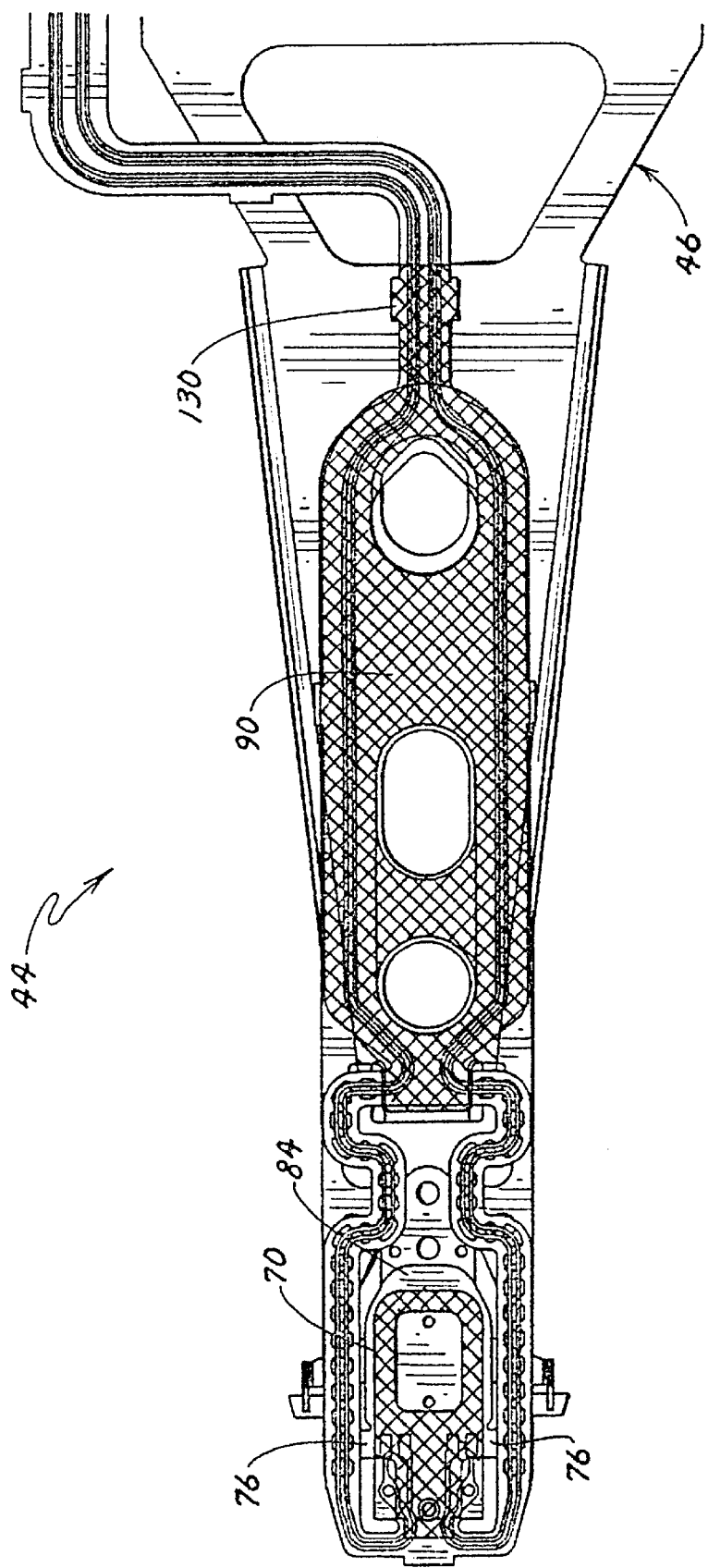
FIG. 5 is a top plan view of the suspension/electrical interconnect shown in FIG. 3.

FIGS. 3–5 illustrate an example of a head suspension/electrical interconnect assembly 44 for which the present invention is intended. Assembly 44 may have varying configurations depending upon the manufacturer. Assembly 44 is comprised of four primary components: electrical interconnect 36, flexure 45, loadbeam 46, and a baseplate (not shown for the purposes of clarity).

The loadbeam 46 can be properly described as having a mounting region 48 (to which a baseplate is mounted), a spring region 50, a load beam body 52, and a loadpoint 54. Similarly, the flexure 45 is comprised of a flexure body 56 and a gimbal region 58. The flexure body 56 is rigidly affixed to the load beam body 52, typically with one or more spot welds. As such, the gimbal region 58 of the flexure 45 is not rigidly affixed to the loadbeam 46. Within the gimbal region 58 of the flexure 45, there is a support pad, commonly referred to as the tongue 60. The tongue 60 is in point contact with the loadpoint 54, and provides for a mounting surface to which the slider is affixed with adhesive or some other means. The tongue 60 is connected to the flexure body 56 by resilient springs, commonly referred to as flexure arms 62. This construction of flexure 45 and load beam 46 provides for the tongue 60 to pivot, or gimbal, about the loadpoint 54 when a small torque is applied. The flexure 45 and load beam 46 assembly is referred to as a "conventional" suspension assembly. After the electrical interconnect 36 has been applied to a conventional suspension assembly, the assembly will more properly be referred to as a head suspension/electrical interconnect assembly 44.

The electrical interconnect 36, as described previously, generally consists of a base substrate 40, such as polyimide, supporting electrical leads or traces 42. At one end of the electrical interconnect 36 are slider termination pads 64 (best seen in FIG. 8) that form electrical connections to the read/write head. The electrical interconnect 36 may also have an area of substrate that is sandwiched between the flexure tongue 60 and the read/write head slider (not shown in these FIGS. 3–5). The electrical interconnect 36 is attached to the conventional suspension assembly such that is rigidly affixed to the suspension assembly in areas proximal to the flexure body 56 and load beam body 52. The electrical interconnect 36 may also be rigidly attached to the flexure tongue 60.

It is desirable to attach the electrical interconnect 36 to the conventional head suspension assembly as described previously, without significantly impacting the performance of the conventional head suspension assembly. Specifically, while adhesive is needed to affix the electrical interconnect 36 to both the load beam body 46/flexure body 56 and flexure tongue 60, adhesive in the flexure arm 62 region of the conventional assembly can cause significant performance issues. Adhesive in the flexure arm 62 region can cause changes to the static angle of the tongue 60 resting on the loadpoint 54, as well as increases to the rotational stiffness of the gimbal region 58. Additionally, due to the wicking nature of the adhesive used to attach the electrical interconnect 36 to the conventional head suspension, an adhesive bond is formed not only at the interface between the adjacent surfaces of the electrical interconnect 36 and the conventional head suspension assembly, but also between the adjacent surfaces of the flexure 45 and the load beam 46. The adhesive bonds resulting from the attachment of the electrical interconnect 36 to the conventional head suspension assembly can significantly affect the resulting bending stiffness of the head suspension/electrical interconnect assembly 44, thereby changing it's dynamic resonant characteristics. As such, it is desired that the adhesive bond characteristics are repeatable from one assembly to the next.

Figure 6A:
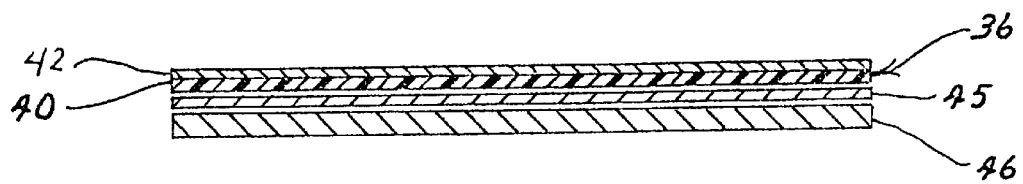
FIGS. 6A–6D are an illustrative, sectional view of a suspension interconnect with various discontinuities in the flexure and load beam layers.

Referring now to FIGS. 6A–6D, the present invention will be described in broad detail. FIGS. 6A–6D illustrate a cross sectional view of the various components comprising a head suspension/electrical interconnect 44. FIG. 6A is a cross section through a typical assembly and provides an example of the layered construction of the head suspension/electrical interconnect 44 prior to adhesive attachment of the electrical interconnect 36, wherein the construction comprises a stainless steel load beam 46, a stainless steel flexure 45, electrical interconnect substrate 40, and electrical traces or leads 42.

Figure 6B:
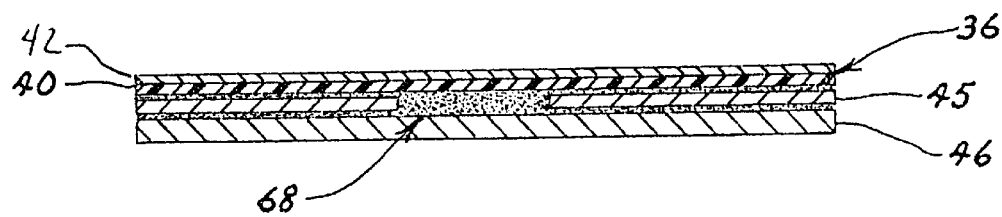

FIG. 6B is a cross section through a typical assembly and exemplifies the adhesive flow characteristics resulting from the administration of adhesive between the substrate material and flexure material, when there is an opening or discontinuity 68 in the flexure material. The adhesive's cohesive nature is sufficient enough to "wick" or spread across the discontinuity 68. As such, a discontinuity 68 or opening in the flexure material does not inhibit the adhesive from flowing beyond the discontinuity 68, if the substrate material and load beam material are still present above and below the discontinuity 68.

Figure 6C:
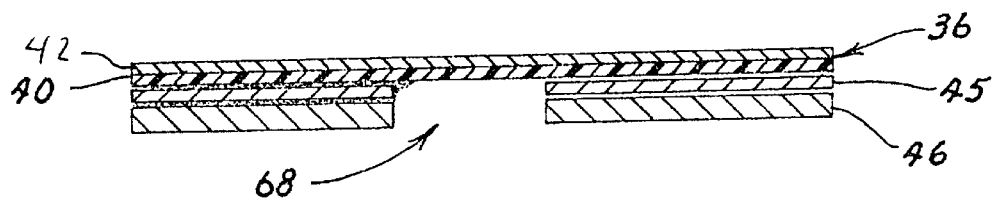

FIG. 6C is a cross section through a typical assembly and illustrates the adhesive flow characteristics when a discontinuity 68 is present in both the flexure 45 and the load beam 46, and adhesive is administered to the construction from the left side of the cross section between the flexure material and substrate material, and between the flexure material and load beam material. In this case, the adhesive is not able to "wick" or flow beyond the discontinuity 68 (to the right side of the cross section). This geometry provides for a good adhesive boundary.

Figure 6D:
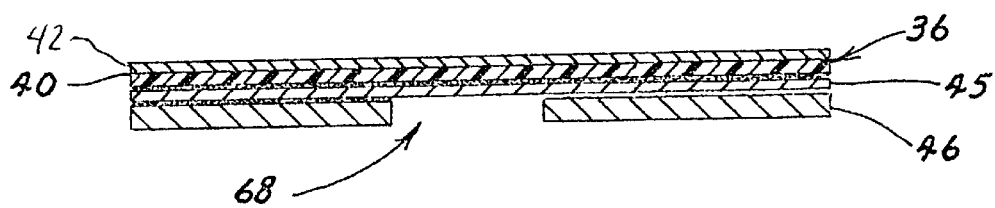

In the cross section shown in FIG. 6D, a discontinuity 68 or opening is present in the load beam 46 only. With adhesive presented to the left side of the cross section between the flexure material and substrate material, as well as between the load beam material and flexure material, the flow of adhesive in the flexure 45/load beam 46 interface is retarded at the discontinuity 68. FIG. 6D presents an example of a useful means of retarding the flow of adhesive between the flexure 45 and the load beam 46, while allowing unimpeded adhesive flow at the substrate/flexure 45 interface.

Discontinuities 68 in the flexure and load beam material interfaces can be created by placing holes in either of the materials or by perimeter patterning of the two components. These discontinuities, then prevent wicking of the adhesive because of the lack of two adjacent surfaces to flow between. Control of the wicking of the adhesive either through the use of appropriately placed through holes or by the configuration of the two adjacent surfaces enables the manufacturer to control where the adhesive flows. That is, the adhesive will wick or flow readily only between adjacent surfaces. Thus, providing a discontinuity in the adjacency of the surfaces will inhibit the wicking of the adhesive. Such discontinuities can be created by holes or through the configuration of the adjacent surfaces.

Referring again to FIGS. 4 and 5, these Figures represent an exploded view and top plan view of the assembly 44 that is shown in FIG. 3, demonstrating the intended usefulness of the present invention. In order to adhesively attach the electrical interconnect 36 to the conventional suspension assembly, comprising a flexure 45 and load beam 46, adhesive is dispensed onto the surface of the flexure body 56 and the tongue 60. The electrical interconnect 36 is then placed onto the conventional suspension, causing the adhesive to wick or flow along the substrate 40/flexure 45/and load beam 46 interfaces. That is, where there are two adjacent surfaces between the substrate 40 and the flexure 45, the adhesive will flow therebetween due to the wicking action of the adhesive.

The resulting substrate 40/tongue 60 adhesive interface 70 on the tongue 60 of the flexure 45 in FIG. 4 is illustrated by cross hatching. This adhesive interface 70 is limited to the tongue 60, and no adhesive is allowed to flow into the sensitive flexure arms 62 region of the gimbal region 58. Initially, wicking flow of the adhesive is limited by the shape of the tongue itself, whose perimeter 72 is disconnected from the gimbal region 58. This disconnect halts the wicking flow of the adhesive because there are no longer two surfaces of the interconnect 36 and flexure 45 lying adjacent to each other where the disconnect occurs. That is, this is a result of a disconnect created in the substrate 40/tongue 60 interface where the substrate 40 overlies the perimeter 72 of the tongue 60 before running adjacent to the flexure arms 62. That is, flow of the adhesive at the interface 70 is confined to the area outlined by the tongue 60 itself, which is defined in part by an edge or perimeter 72, and the forwardly extending tab 74. It will be observed that the adhesive does not wick laterally along the tongue arms 76 because the point where the wicking ceases is where overlying material forming the slider and termination pad support surface 78 of the interconnect 36 ceases. That is, as best seen considering FIGS. 4 and 5, the lateral wicking of the adhesive along the tongue arms 76 of the flexure 45 is inhibited by the lack of an overlying surface on the interconnect 36. Thus, the lines 80 and 82 at their lower ends delineate the lateral boundary of the adhesive wicking on the tongue 60 and at their upper ends delineate the perimeter 84 of the slider and termination pad support surface 78 of the interconnect 36. Stated otherwise, the the slider and termination pad support surface 78 of interconnect 36 is defined by its perimeter 84 and that perimeter in part defines the configuration of the adhesive interface 70.

The substrate 40/flexure body 56 adhesive interface 90 on the flexure body 56 results from adhesive wicking and flow and is illustrated by a cross hatching pattern also. It should be noted that the adhesive interface 90 is also defined by the respective areas of surface overlap or adjacency between the interconnect 36 and the flexure 45. It will be observed that, as illustrated, this particular interconnect configuration includes openings 92 and 94. Opening 92 overlies openings 96 and 98 in flexure 45. Opening 92 thus inhibits wicking flow of adhesive and its perimeter serves to define the perimeter of the opening 100 in the adhesive interface 90. Lines 102 and 104 at their upper ends delineate the lateral extent of the perimeter 106 defining the opening 92 and at their lower end, the lateral incursion inwardly of the adhesive interface 90.

Because the intereconnect 36 presents a continuous surface distally of the opening 92, adhesive would flow distally between the interconnect 36 and the flexure 45 since they present adjacent surfaces distally therefrom. To prevent the adhesive from doing so, and thus from flowing onto the sensitive flexure arm 62 region, the adhesive flow is terminated in the distal or longitudinal direction at the flexure adhesive control feature 110, which comprises a laterally extending opening in the flexure 45. This opening 110, then, provides a discontinuity in the adjacency of the surfaces of the interconnect 36 and the flexure 45 and thus inhibits adhesive wicking in the longitudinal direction distally of the adhesive control feature 110. Thus, line 112 at its upper end marks the distal perimeter of the adhesive control feature 110 and at its lower end marks the distal boundary of the adhesive interface 140.

In addition, lateral flow of the adhesive at the distal end of the interface 90 is inhibited by adhesive control features 120. This feature was able to inhibit the flow of adhesive into the flexure arm 62 region primarily because the substrate 40 of interconnect 36 passed over the flexure adhesive control feature 120, which was directly above the load beam adhesive control features 122 found on loadbeam 46. This created a disconnect in the substrate 40/flexure body 56 interface similar to that shown in FIG. 6C, where there was a discontinuity or opening 68 in both the flexure and loadbeam materials. Thus, adhesive is kept out of the interconnect 36/flexure 45 interface 90 in the sensitive flexure arm 62 region.

Notice, however, that adhesive was allowed to flow proximally, that is, in the direction of the voice coil motor assembly 28, past the distal perimeter of the flexure 45 towards the spring region 50 of the suspension, because a substrate 40/load beam 46 adhesive interface 130 exists (similar to FIG. 6B). The configuration of this interface defined by the perimeter of the interconnect arm 132. Thus, the limits of the lateral extent of the adhesive flow is illustrated by lines 134 and 136, which at their top ends intersect with the lateral extent of the arm 132 and at their bottom ends intersect with the lateral extent of the adhesive interface 130.

The creation of a substrate 40/load beam 46 adhesive interface 130 also provides the adhesive with access to the flexure body 56/load beam 46 interface 140. That is, depending upon the initial placements of the adhesive during the manufacturing operation, the adhesive can wick between the interface 90, the interface 130, and the interface 140. The resulting flexure body 56/load beam 46 adhesive interface 140 is terminated laterally at the proximal end thereof by the perimeter pattern or configuration of the overlying flexure 45 and at the distal end by the lateral narrowing of the load beam 46. In addition, the interface 140 is terminated at the distal end in the longitudinal direction by discontinuities created by the flexure adhesive control feature 110 and by adhesive control features 124, which appear as slots extending laterally from adhesive control feature 120. This termination is indicated by line 142. In the lateral direction, interface 140 is terminated at the distal end by the flexure 45/load beam 45 adhesive control features 120 and 122, respectively. That is, the primarily longitudinal flow of adhesive at the interface 140 toward the flexure arm 62 region is inhibited by these adhesive control features 110, 120, 122, and 124. As such, adhesive is kept out of the load beam 46/flexure 45 interface 140 in the sensitive flexure arm 62 region.

Flexure adhesive control features 110, 120, and 124, in combination with the load beam adhesive control feature 122, create discontinuities in the substrate 40/flexure 45 interface and the flexure 45/load beam 46 interfaces that are sufficient to stop the flow of adhesive into the sensitive areas of the suspension/electrical interconnect assembly 44 which could result in part to part variability and degraded performance.

Figure 7:
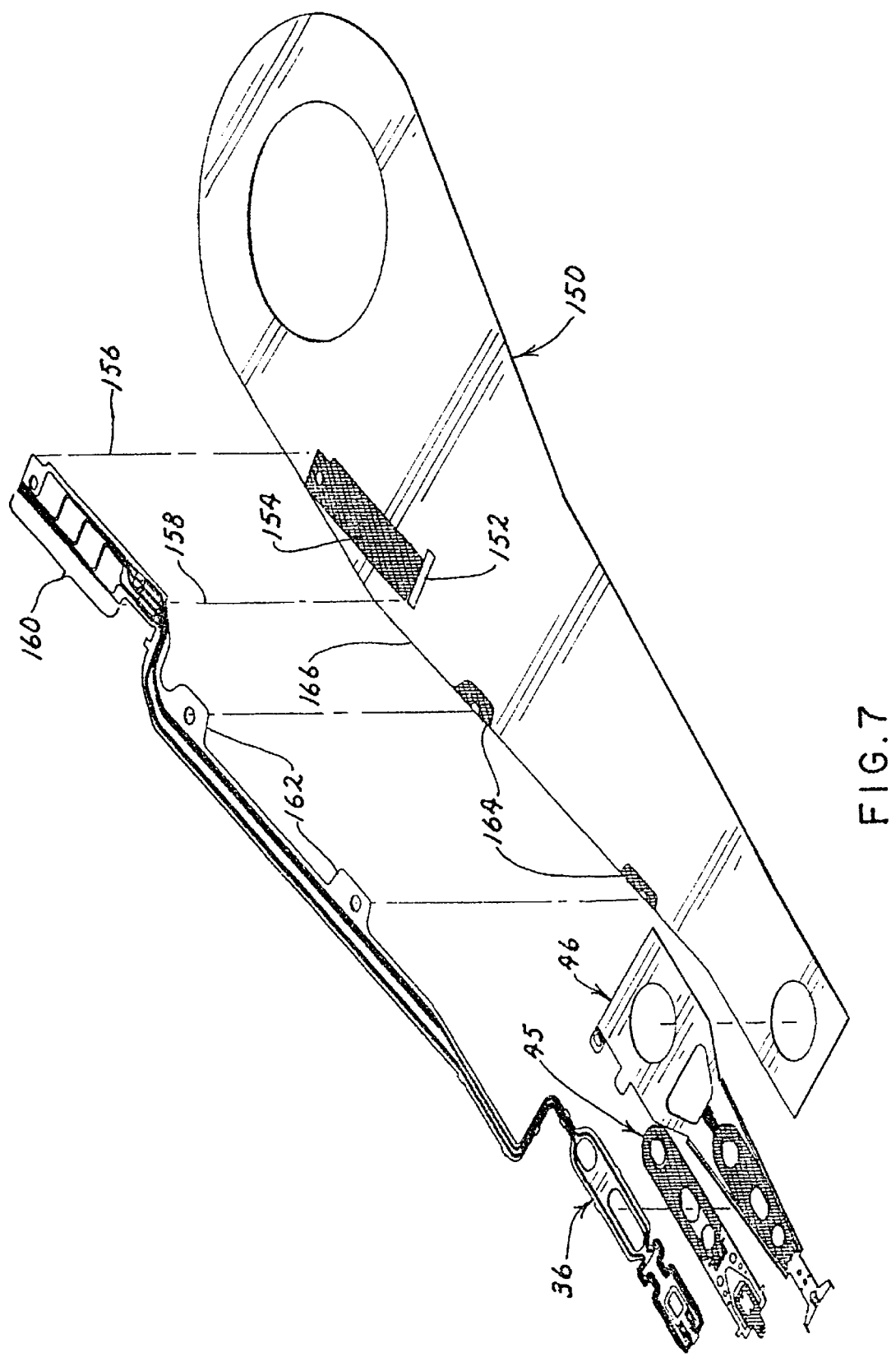
FIG. 7 is an exploded, perspective view of a suspension/electrical interconnect that includes an arm.

FIG. 7 shows the use of adhesive control features on the armature 150 (either a "Una-mount" or an E-block) to which the suspension/electrical interconnect assembly 44 is mounted. The electrical interconnect 36 runs along the length of the armature 150 and is then terminated to the "actuator flex" (not shown). The armature's adhesive control feature 152 impedes the flow of adhesive from the adhesive interface 154 along the armature 150/substrate 40 interface from right to left, that is, proximally to distally, in FIG. 7. Line 156 delineates at its bottom end the proximal end of the interconnect 36/armature 150 interface 154 and at its top end the proximal end of the interconnect 36, thus illustrating that the adhesive interface is limited at the proximal end by the overlying configuration of the interconnect 36. Line 158 delineate at its bottom end the distal extent of the interface 154 and at its top end the distal extent of the termination pad region 160 of the interconnect 36, thus illustrating how the interface 154 provides a solid attachment between the interconnect 36 and the armature 150.

It will be noted that the interconnect 36 includes a pair of small tabs 162 that overlay the armature 150, thus cooperating therewith to create interconnect 36/armature interfaces 164. In this case the lateral perimeter 166 of the armature 150 serves as a discontinuity in the substrate 40/armature 150 interface, which impedes the adhesive from flowing any further onto the substrate 40 and the configuration of the tabs 162 prevents the adhesive from flowing further onto the armature 150.

Figure 8:
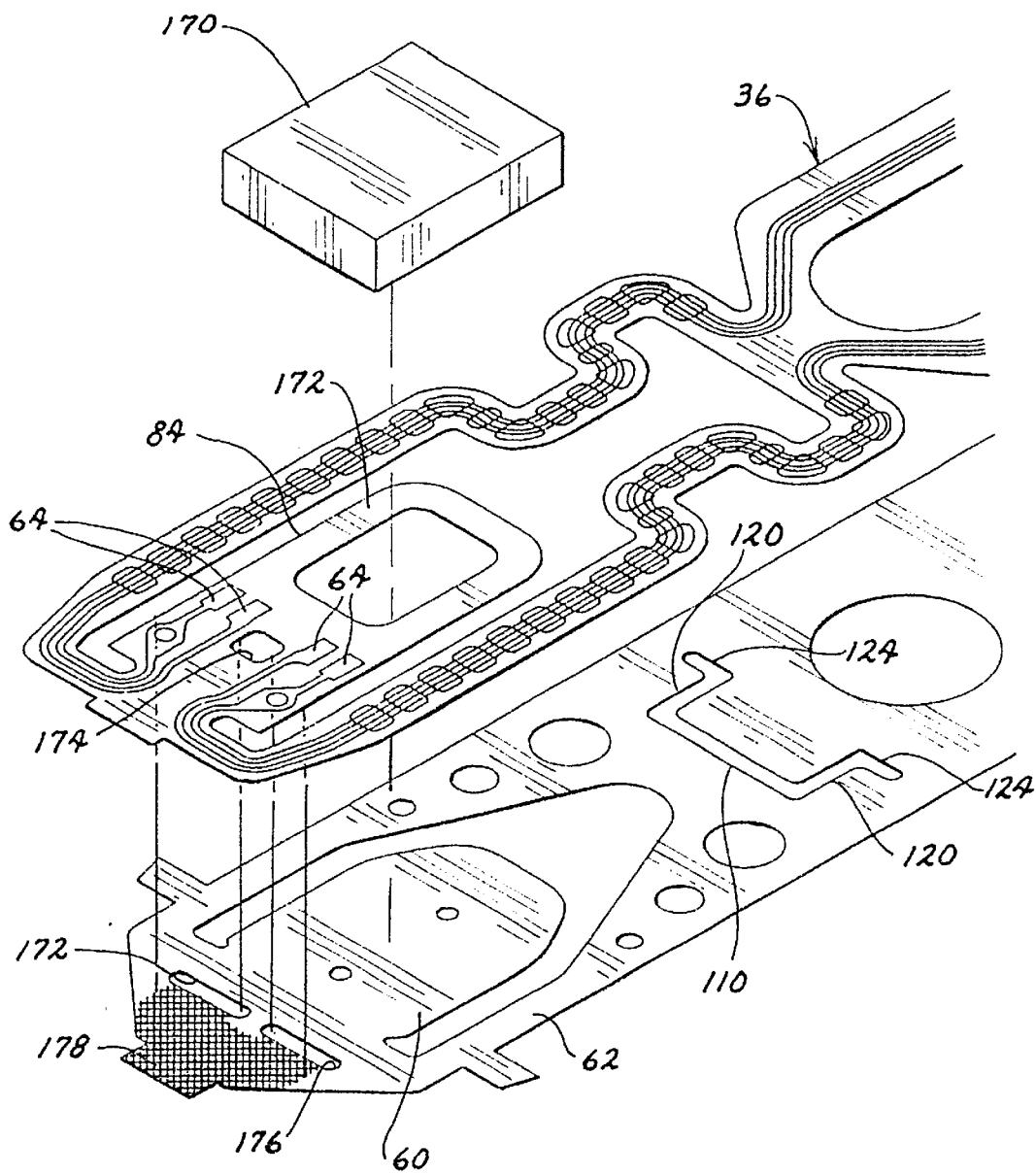
FIG. 8 is an enlarged, exploded, perspective view of a flexure and electrical interconnect, illustrating the use of adhesive control features to restrict the flow of adhesive into the tongue/interconnect interface directly beneath the slider.
Figure 9:
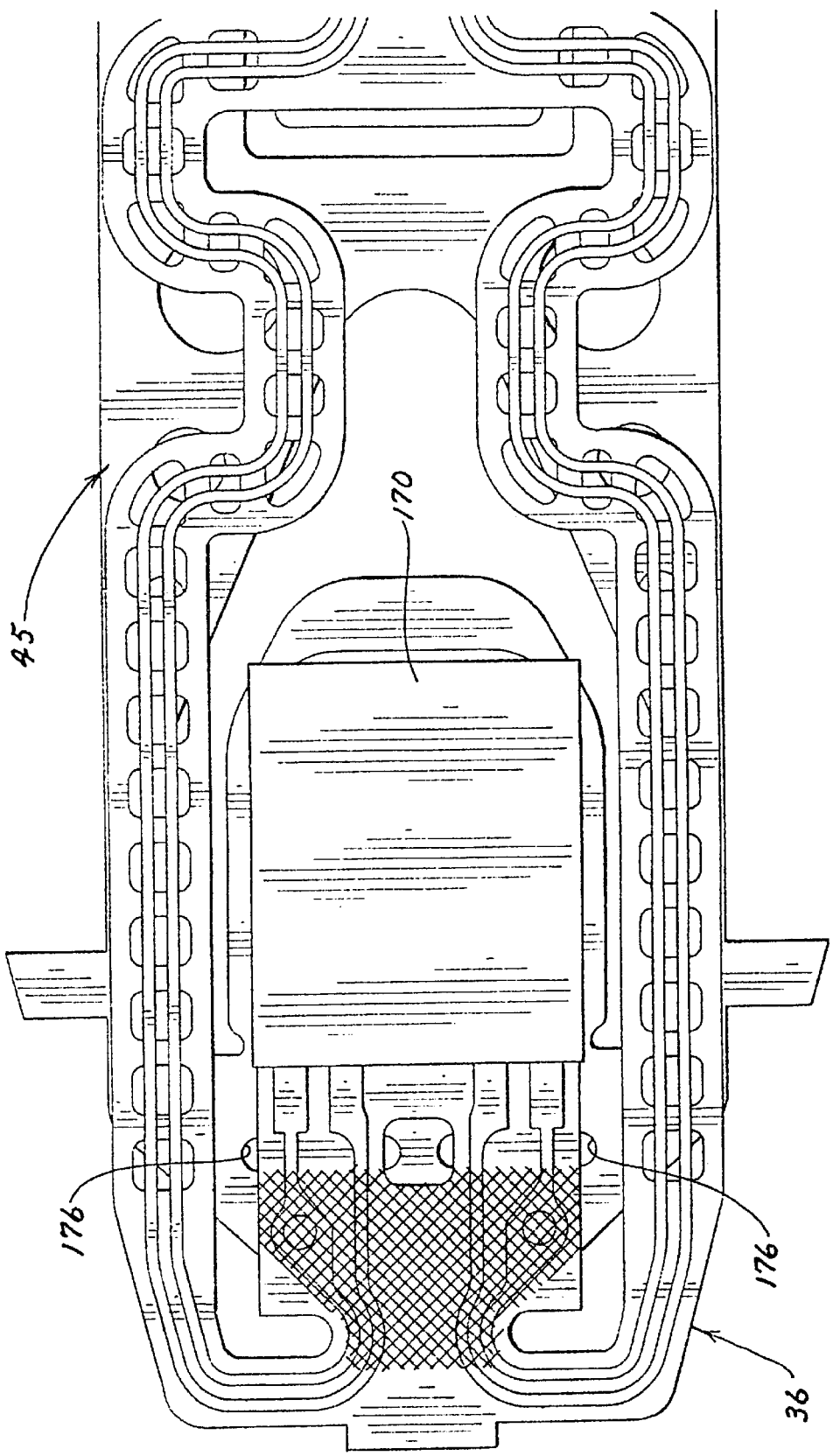
FIG. 9 is an enlarged top plan view of the gimbal region of the assembly shown in FIG. 8.

FIGS. 8 and 9 exemplify another useful embodiment of the present invention. As discussed previously, the read/write slider 170 is mounted to the tongue 60 of the flexure 45. Often times, as depicted in FIGS. 8 and 9, a substrate tongue 172 of the electrical interconnect 36 is "sandwiched" between the read/write slider 170 and the tongue 60 of the flexure 45. As such, the distance between the adjacent surfaces of the read/write slider 170 and the tongue 60 is a function of the substrate's tongue 172 thickness and the thickness of the adhesive bond between the substrate tongue 172 and the tongue 60, if present beneath the read/write slider 170. As a result, the distance between the read/write slider 170 and the tongue 60 of the flexure can be minimized by not allowing adhesive to be present in the substrate tongue 172/flexure tongue 60 interface directly beneath the read/write slider. Keeping the adhesive out of this interface also minimizes the angle variation between the substrate tongue 172 and the flexure tongue 60. FIGS. 8 and 9 depict a configuration wherein adhesive is dispensed on the distal end of the tongue 60, and substrate adhesive control feature 174 in combination with flexure adhesive control features 176, configured as slots as shown in the Figures, restrict the flow of adhesive into the substrate/tongue interface beneath the read/write slider 170 by limiting the ability of the adhesive to wick in the proximal direction. The adhesive interface 178 that is created with this construction is represented by cross hatching.

Figure 10:
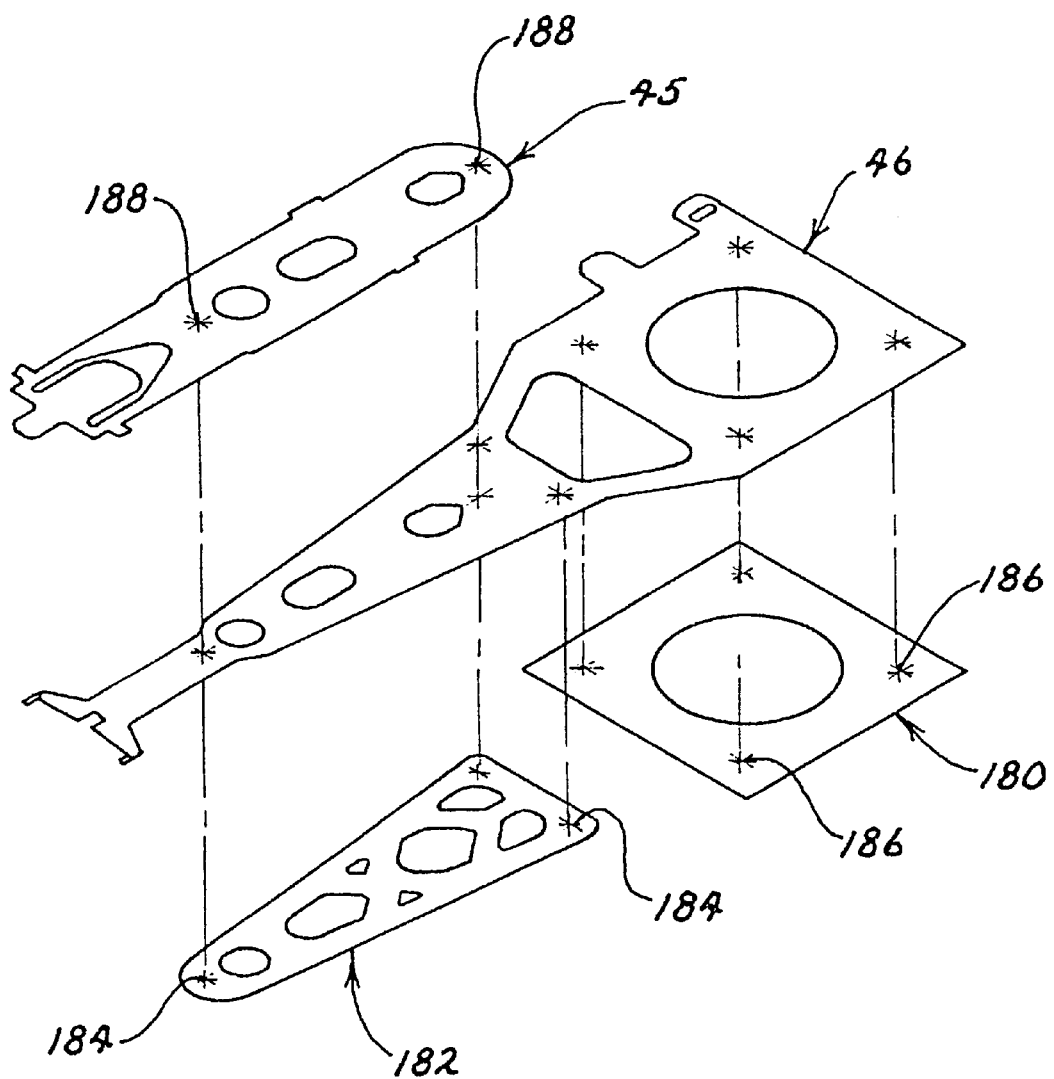
FIG. 10 is an exploded, perspective, schematic view of a suspension/electrical interconnect that includes a load beam stiffener.
Figure 11:
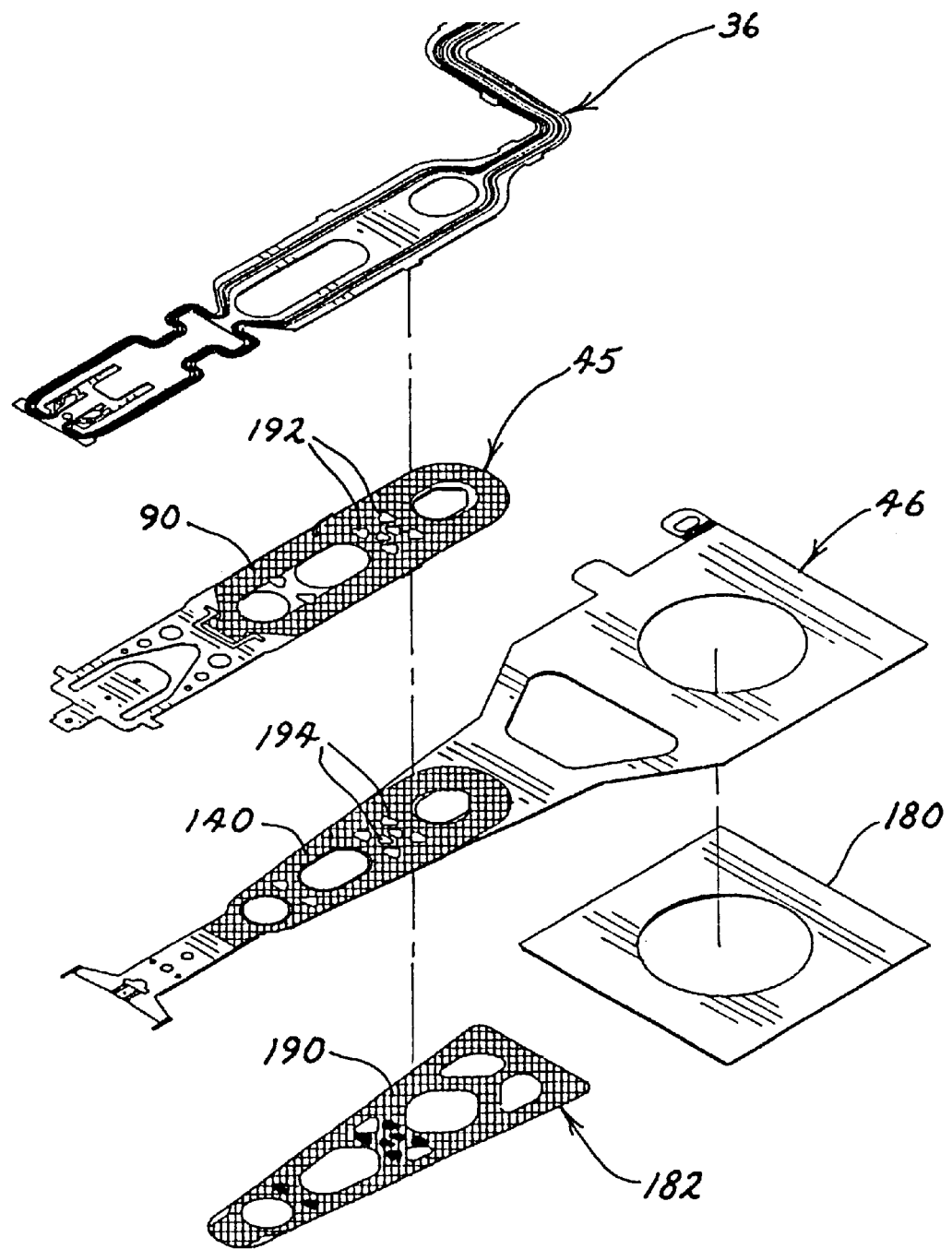
FIG. 11 is an exploded, perspective view of a suspension/electrical interconnect that includes a load beam stiffener and illustrating the use of adhesive control features to facilitate the flow of adhesive into the stiffener/load beam interface and the load beam/flexure interface.

FIGS. 10 and 11 illustrates an additional embodiment of the present invention. As discussed previously, a conventional head suspension assembly is typically comprised of a flexure 45, loadbeam 46, and electrical interconnect 36 (with the interconnect 36 having been omitted from FIG. 10 for reasons of simplicity of illustration), and may include a baseplate 180. In some instances, however, it is desirable to also include a loadbeam stiffening member, or stiffener 182, to enhance the dynamic performance of the head suspension assembly. Typically, the stiffener 182 is attached to the load beam 46 with one or more spot welds 184, much like the method in which the baseplate 180 is attached to the mounting region 48 of the load beam 46 with spot welds 186, and the flexure 45 is attached to the load beam 46 with spot welds 188. The attachment of a stiffener 182 to a loadbeam 46 with spot welds 184 serves to significantly increase the stiffness of the loadbeam member, thereby increasing the natural frequencies of the conventional head suspension assembly. Additional gains in performance can be realized, however, if the stiffener 182 were intrinsically attached to the loadbeam, rather than with just one or more spot welds. These spot welds are shown in FIG. 10, which illustrates the flexure 45, loadbeam 46 and stiffener 182 in a schematic, outline form for purposes of simplicity of illustration.

Thus, FIGS. 10 and 11 show an exploded view of a head suspension assembly which utilizes adhesive control features to facilitate the flow of adhesive not only into the flexure 45/electrical interconnect interface 90 and flexure 45/load beam 46 interface 140, but also into the loadbeam 46/stiffener 182 interface 190. This invention provides for adhesive flow ports 192 through the flexure 45 and adhesive flow ports 194 through the load beam 46, thus allowing the adhesive to flow into load beam 46/stiffener 182 interface 190. As a result, the stiffener 182, is attached to the load beam by both spot welds 184 and the adhesive bond interface 190. This provides for an intimate union of the load beam 46 and stiffener 182 resulting in a structure with enhanced dynamic response performance.

Adhesive flow ports 192 in the flexure 45 may also warrant use with conventional head suspension assemblies that do not include a stiffener 182, so as to facilitate the flow of adhesive into the loadbeam 46/flexure 45 interface 140 resulting in enhanced dynamic response performance of the assembly.

Modifications, alterations, or substitutions of the foregoing invention are suggested by its teachings. For example, adhesive control features or interface discontinuities could be used to create separation between two dissimilar adhesives on the load beam body or tongue (i.e. a conductive epoxy in proximity to a structural adhesive, or a damping adhesive in proximity to a structural adhesive).

In addition, the present invention could find many instances of applications with wireless head suspension assemblies which do not require adhesive attachment of the electrical interconnect (such as TSA, CIS, CAPS, etc.). For example, the addition of structural adhesive into the load beam/flexure body interface can be done to improve the dynamic resonant characteristics of the assembly. As such, adhesive control features would be needed to keep the adhesive interface from encroaching into the sensitive gimbal area of the flexure.

The present invention as described herein is applicable to any variant of the components or elements such as, dual-layered interconnects, integrated gimbal products, microactuated products, "Femto" products, and products intended to be used with a headlift.

The present invention having thus been described, other modifications, alterations, or substitutions may now suggest themselves to those skilled in the art, all of which are within the spirit and scope of the present invention. It is therefore intended that the present invention be limited only by the scope of the attached claims below.

What is claimed is:

1. A flex suspension assembly comprising a load beam, a flexure, and an adhesive layer between adjacent surfaces of said load beam and said flexure that cooperate to define a load beam/flexure interface, said adhesive layer including at least one boundary defined by one or more adhesive control features for preventing the flow of adhesive beyond said boundary, wherein said adhesive control features include an opening provided through a thickness of one of said load beam and said flexure positioned to create said boundary.

2. The assembly of claim 1 wherein said flexure includes a flexure arm region and wherein said adhesive control features comprise flexure adhesive control features for controlling the flow of adhesive between adjacent surfaces of said load beam and said flexure and to restrict the flow of adhesive into the flexure arm region during manufacture of said assembly.

3. The assembly of claim 2 wherein said flexure includes a flexure arm region and wherein said adhesive control features comprise load beam adhesive control features for controlling the flow of adhesive between adjacent surfaces of said load beam and said flexure and to restrict the flow of adhesive into the flexure arm region during manufacture of said assembly.

4. The assembly of claim 1 wherein said flexure includes a flexure arm region and wherein said adhesive control features comprise load beam adhesive control features for controlling the flow of adhesive between adjacent surfaces of said load beam and said flexure and to restrict the flow of adhesive into the flexure arm region during manufacture of said assembly.

5. The assembly of claim 1 wherein said assembly includes a stiffener, said stiffener underlying and supporting said load beam and cooperating therewith to define a stiffener/load beam interface, wherein said load beam includes adhesive ports for allowing adhesive to flow from said load beam/flexure interface into said stiffener/load beam interface.

6. The assembly of claim 5 wherein said assembly includes an electrical interconnect which cooperates with said flexure to define a flexure/interconnect interface, wherein said flexure includes adhesive ports for allowing adhesive to flow from said flexure/interconnect interface into said flexure/load beam interface.

7. The assembly of claim 1 wherein said assembly includes an electrical interconnect which cooperates with said flexure to define a flexure/interconnect interface and wherein said assembly includes a stiffener, said stiffener underlying and supporting said load beam and cooperating therewith to define a stiffener/load beam interface, wherein said flexure includes adhesive ports for allowing adhesive to flow from said flexure/interconnect interface into said flexure/load beam interface.

8. A flex suspension assembly comprising a load beam, a flexure, and an electrical interconnect, wherein said load beam and flexure are adhesively attached to each other and cooperate to define a load beam/flexure interface, and wherein said flexure includes flexure/interconnect interface adhesive control features for controlling the flow of adhesive between said flexure and said interconnect, wherein said adhesive control features include an opening provided through a thickness of one of said flexure and said interconnect positioned to create a boundary of an adhesive layer between said flexure and said interconnect.

9. The assembly of claim 8 wherein said flexure includes a flexure arm region and wherein said adhesive control features comprise flexure adhesive control features for controlling the flow of adhesive between adjacent surfaces of said interconnect and said flexure and to restrict the flow of adhesive into the flexure arm region during manufacture of said assembly.

10. The assembly of claim 8 wherein said flexure includes a flexure arm region and wherein said adhesive control features comprise interconnect adhesive control features for controlling the flow of adhesive between adjacent surfaces of said interconnect and said flexure and to restrict the flow of adhesive into the flexure arm region during manufacture of said assembly.

11. The assembly of claim 8 wherein said flexure includes a flexure arm region and wherein said adhesive control features comprise interconnect adhesive control features for controlling the flow of adhesive between adjacent surfaces of said load beam and said flexure and to restrict the flow of adhesive into the flexure arm region during manufacture of said assembly.

12. The assembly of claim 8 wherein said flexure includes a flexure tongue and said interconnect includes an interconnect tongue, said tongues being substantially adjacent to each other and wherein said assembly includes flexure tongue/interconnect tongue interface adhesive control features for controlling the flow adhesive between said flexure tongue and said interconnect tongue during manufacture of said assembly.

13. The assembly of claim 8 and further including an armature, wherein said interconnect includes a termination pad region having a perimeter, said termination pad region of said interconnect being adhesively attached to said armature at a termination pad region/armature interface, said armature include armature adhesive control features to restrict flow of the adhesive beyond said termination pad perimeter.

14. The assembly of claim 8 wherein said assembly includes a stiffener, said stiffener underlying and supporting said load beam and cooperating therewith to define a stiffener/load beam interface, wherein said flexure includes adhesive ports for allowing adhesive to flow from said flexure/interconnect interface into said flexure/load beam interface.

15. The assembly of claim 8 wherein said load beam includes flexure/load beam interface adhesive control features for controlling the flow of adhesive between said load beam and said flexure.

16. The assembly of claim 15 wherein said flexure includes a flexure arm region and wherein said adhesive control features comprise flexure adhesive control features for controlling the flow of adhesive between adjacent surfaces of said load beam and said flexure and to restrict the flow of adhesive into the flexure arm region during manufacture of said assembly.

17. The assembly of claim 16 wherein said flexure includes a flexure arm region and wherein said adhesive control features comprise load beam adhesive control features for controlling the flow of adhesive between adjacent surfaces of said load beam and said flexure and to restrict the flow of adhesive into the flexure arm region during manufacture of said assembly.

18. The assembly of claim 15 wherein said flexure includes a flexure arm region and wherein said adhesive control features comprise load beam adhesive control features for controlling the flow of adhesive between the adjacent surfaces of said load beam and said flexure and to restrict the flow of adhesive into the flexure arm region during manufacture of said assembly.

19. The assembly of claim 15 wherein said flexure includes a flexure tongue and said interconnect includes and interconnect tongue, said tongues being substantially adjacent to each other and wherein said assembly includes flexure tongue/interconnect tongue interface adhesive control features for controlling the flow adhesive between said flexure tongue and said interconnect tongue during manufacture of said assembly.

20. The assembly of claim 15 wherein said flexure includes a flexure arm region and a flexure tongue and said interconnect includes an interconnect tongue, said tongues being substantially adjacent to each other and wherein said assembly includes flexure tongue/interconnect tongue interface adhesive control features for restricting the flow of adhesive into said flexure arm region during manufacture of said assembly.

21. The assembly of claim 15 and further including an armature, wherein said interconnect includes a termination pad region having a perimeter, said termination pad region of said interconnect being adhesively attached to said armature at a termination pad region/armature interface, said armature including armature adhesive control features to restrict flow of the adhesive beyond said termination pad perimeter.

22. The assembly of claim 15 wherein said assembly includes a stiffener, said stiffener underlying and supporting said load beam and cooperating therewith to define a stiffener/load beam interface, wherein said load beam includes adhesive ports for allowing adhesive to flow from said load beam/flexure interface into said stiffener/load beam interface.

23. The assembly of claim 15 wherein said flexure includes adhesive ports for allowing adhesive to flow from said flexure/interconnect interface into said flexure/load beam interface.

24. The assembly of claim 15 wherein said assembly includes a stiffener, said stiffener underlying and supporting said load beam and cooperating therewith to define a stiffener/load beam interface, wherein said flexure includes adhesive ports for allowing adhesive to flow from said flexure/interconnect into said flexure/load beam interface.

* * * * *

UNITED STATES PATENT AND TRADEMARK OFFICE
CERTIFICATE OF CORRECTION

PATENT NO.    : 6,741,426 B2
DATED         : May 25, 2004
INVENTOR(S)   : Girard Page 1 of 1

It is certified that error appears in the above-identified patent and that said Letters Patent is hereby corrected as shown below:

Title page,
Item [60], Related U.S. Application Data, "filed on Feb. 25, 2003," should be -- filed on Feb. 25, 2000, --.

Signed and Sealed this

Ninth Day of November, 2004

JON W. DUDAS
*Director of the United States Patent and Trademark Office*